April 7, 1942.  G. F. WIKLE  2,278,602
METHOD AND APPARATUS FOR PREPARING AND HANDLING RUBBER MATERIAL
Filed March 8, 1939   6 Sheets-Sheet 1

INVENTOR.
GEORGE F. WIKLE
BY *Gourley & Budley*
ATTORNEYS.

Fig. 3

April 7, 1942.   G. F. WIKLE   2,278,602
METHOD AND APPARATUS FOR PREPARING AND HANDLING RUBBER MATERIAL
Filed March 8, 1939   6 Sheets-Sheet 3

Fig. 4

INVENTOR.
GEORGE F. WIKLE
BY
ATTORNEYS.

April 7, 1942.  G. F. WIKLE  2,278,602
METHOD AND APPARATUS FOR PREPARING AND HANDLING RUBBER MATERIAL
Filed March 8, 1939  6 Sheets-Sheet 5

INVENTOR.
GEORGE F. WIKLE
BY *[signature]*
ATTORNEYS.

Patented Apr. 7, 1942

2,278,602

UNITED STATES PATENT OFFICE 2,278,602

METHOD AND APPARATUS FOR PREPARING AND HANDLING RUBBER MATERIAL

George F. Wikle, Detroit, Mich., assignor to United States Rubber Company, New York, N. Y., a corporation of New Jersey Application March 8, 1939, Serial No. 260,520

15 Claims. (Cl. 91—14)

This invention relates to an apparatus and methods for manipulating and preparing rubber stock, and in particular it relates to an apparatus and method for coating rubber stock with a lubricant, cooling the stock, cutting it into uniform slabs, and piling the slabs of stock onto a platform.

In the processing of rubber compositions for the manufacture of rubber articles, such as pneumatic tires, it has been conventional practice to mix the rubber composition in a mixing mill, and to cut and remove this rubber stock from the mill in the form of slabs of rubber. During such mixing operations the temperature of the stock was raised to such a degree that it could not be conveniently handled by an operator except while wearing heavy gloves. These slabs were manually removed from the mill and placed on hooks where they were cooled approximately to room temperature and coated with a lubricating material, after which they were piled on platforms in storage until needed for further processing. The cooling of these slabs before they were piled for storage was necessary since any substantial amount of heat confined in the stacked slabs had a detrimental effect upon the stock if the stock was allowed to remain in this condition for any appreciable length of time. All of the steps mentioned above have been heretofore performed manually, and as the slabs of stock were relatively heavy and hot, such manual tasks were hazardous and fatiguing.

In accordance with the practice of my invention, I provide an apparatus which receives a hot slab of rubber composition from a mixing mill, and carries the slab of rubber through various stages during which one surface of the slab is treated by the application of a lubricant and a cooling medium is applied to the opposite surface during a continuous movement of the stock. Thereafter the stock is cut into uniform lengths, and the cut lengths are automatically placed in superimposed relation upon a platform or truck skid.

Among the objects of my invention are, to provide an apparatus for treating rubber compositions which will relieve operators of hazardous and fatiguing manual labor, to provide an apparatus which will treat rubber stock uniformly, and to provide an apparatus which economically and efficiently treats and stacks rubber stock in a continuous operation. These and other objects and advantages will appear more fully in the following detailed description when considered in connection with the accompanying drawings, in which:

Fig. 9 is an enlarged detailed plan view of a slab stacking conveyor;

Fig. 11 is a detailed sectional view of a slab stacking conveyor roller, taken along lines XI—XI of Fig. 10; and, Fig. 12 is a diagrammatic view of a portion of the apparatus, illustrating the relationship between the slab stacking conveyor and means for driving the conveyor rollers.

Figure 1:
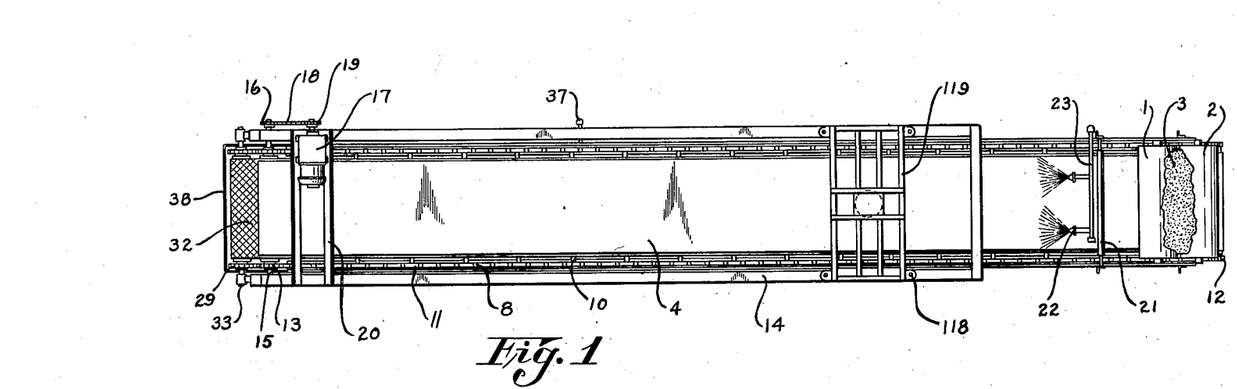
Fig. 1 is a plan view of an apparatus embodying the features of my invention.
Figure 2:
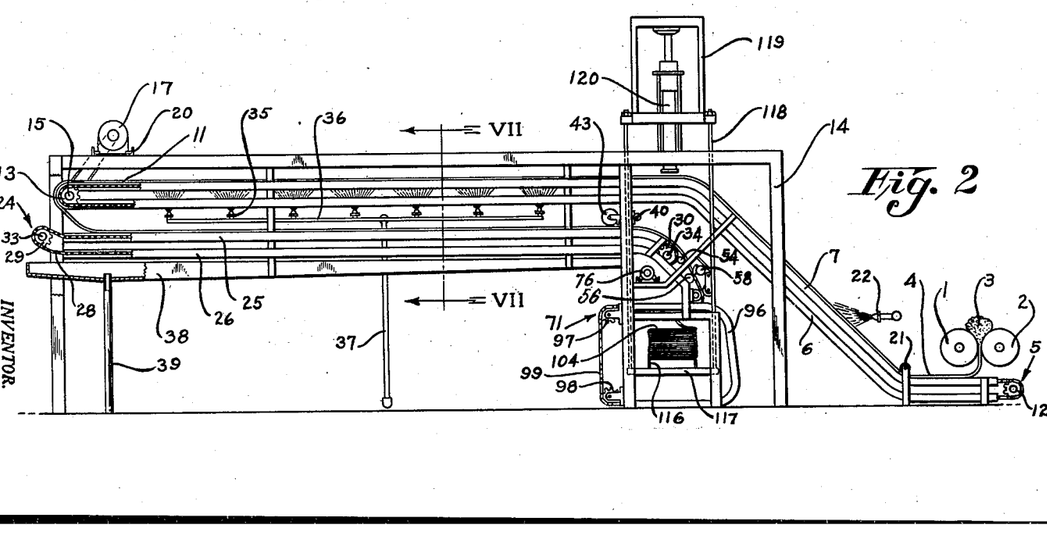
Fig. 2 is a side elevational view thereof.

Referring to the drawings, and in particular to Figs. 1 and 2, I show one form of embodiment of my invention, for association with a conventional mixing mill, illustrated diagrammatically by mill rolls 1 and 2. In accordance with conventional practice, a quantity of rubber stock 3 is placed in the bite of the mill rolls 1 and 2, and for a predetermined period of time the stock is mixed in such manner as to cause a uniform blending of the various ingredients which form the rubber composition and such mixing of the rubber composition causes an appreciable temperature rise therein. After the stock 3 is mixed for a predetermined period, an operator cuts the stock longitudinally of either of the rolls 1 and 2, and the free end of the stock which is rolled in the form of a slab 4 drops by gravity onto a conveyor 5 which transports it to various treating and handling mechanisms.

Figure 7:
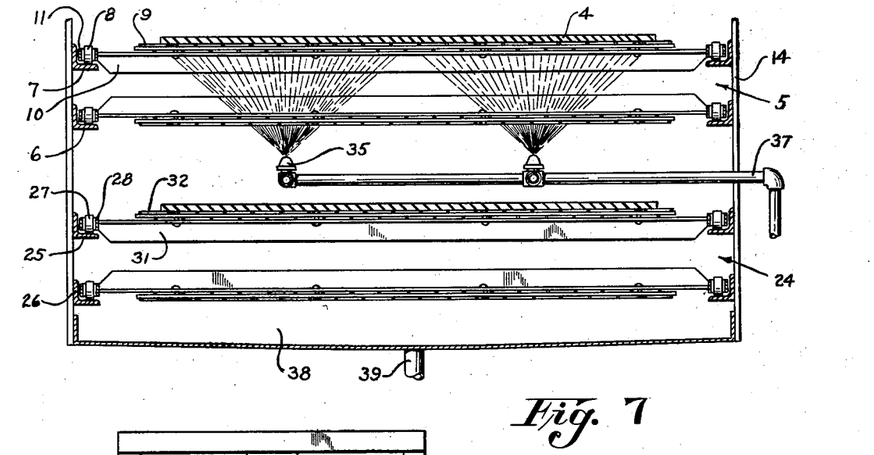
Fig. 7 is a transverse view, in section, of conveyor mechanism, taken along lines VII—VII of Fig. 2.

The conveyor 5 operates as a unit which mechanically functions in synchronism with the remaining mechanisms in the apparatus. The conveyor 5 includes tracks 6 and 7 which engage with a plurality of conveyor belt supporting rollers 8 (Fig. 7). A conveyor belt 9, supported by the rollers 8 through transverse structural members 10, is formed of an open wire or chain mesh attached to the structural members 10. A link chain 11 connects with the rollers 8 and structural members 10 for moving the conveyor belt 9. The link chain 11 associates with sprockets 12 and 13 (Fig. 2) mounted in bearings supported by a structural frame 14. Sprocket 13 is keyed to a shaft 15, and a sprocket 16 (Fig. 1) also keyed to the shaft 15 engages with a combination motor and reduction unit 17 through a chain 18 and sprocket 19. A pair of angles 20 attached to the structural frame 14 support the motor reduction unit 17.

The conveyor 5 moves continuously throughout the operation of the apparatus and carries the slab stock 4 from the mixing mill along the length of the conveyor and transfers the stock from the end of the conveyor 5 to a secondary conveyor hereinafter described. An idler roller 21 near the beginning of the conveyor 5 maintains the stock 4 in contact relation with the conveyor belt 9. From the idler roller 21 the conveyor 5 is inclined upwardly to a height sufficient to accommodate the cutting and stacking apparatus positioned thereunder. The remaining portion of the conveyor 12 continues in a horizontal path.

At the inclined portion of the conveyor 5 means is provided for coating the upper surface of the slab 4 with a lubricant such as a soapstone material suspended in a liquid. The soapstone solution is applied in an atomized manner through nozzles 22 attached to a supply conduit 23. The soapstone lubricant is applied on only one side of the slab 4, and its purpose is to prevent adhesion of adjacent layers of the stock when the slabs are piled in superimposed relation. The soapstone solution is applied shortly after the slab of stock leaves the mixing mill, and the stock being relatively hot, the soapstone solution dries quickly leaving a dry film of lubricating material in adherence with the surface of the stock 4.

As the stock 4 leaves the conveyor 5 it engages a secondary conveyor 24 (Fig. 2) which, like the first named conveyor, comprises tracks 25 and 26 for supporting rollers 27 (Fig. 7) connected to a link chain 28 operating on sprockets 29 and 30 (Fig. 2). Structural angles 31 (Fig. 7) connected with the link chain 28 are attached to and support a wire mesh or chain type conveyor belt 32. The sprocket 29 is an idler sprocket and is rotatably associated with a shaft 33 mounted in bearings attached to the structural frame 14. The sprocket 30 is a drive sprocket keyed to a shaft 34 mounted in bearings attached to the structural frame 14 and is driven continuously throughout the operation of the apparatus by means hereinafter described.

The secondary conveyor 24 is located directly below the conveyor 5 and functions to return the stock 4 a distance substantially equal to the elevated horizontal portion of the conveyor 5. The object of the horizontal travel of the stock along the conveyor 5 and back over conveyor 24 is to permit the stock to cool off prior to the stacking of slabs of the stock. It is essential to cool the stock as it has been found that stacking the slabs of stock while hot will cause detrimental defects in the rubber composition.

In order to facilitate cooling, I provide nozzles 35 (Fig. 2) which direct sprays of cold water against the under side of the stock 4 as it passes over the conveyor 5. The nozzles are connected to a horizontal conduit 36 which joins a vertical conduit 37 connected to a cold water supply. As the conveyor belt 9 is in the form of an open wire mesh, the sprays of water pass through the mesh belt and contact directly with the under surface of the stock 4. The nozzles 35 are located between the conveyor 5 and the conveyor 24, with the result that surplus water directed against the underside of the stock 4 as it rests upon the conveyor 5 will drop onto the same side of the stock 4 upon return movement of the conveyor 24. The single set of sprays, therefore, functions to cool the same side of the rubber stock during its forward and return movements. The cooling operation by the application of water is limited to one side of the stock only. The purpose of this limitation is to prevent washing off of the lubricant which is applied to the opposite side of the stock through the nozzles 22. A drain pan 38 is located directly below the conveyor 24 for collecting the surplus water directed against the rubber stock. The water is removed from the pan 38 by a drain 39.

Figure 3:
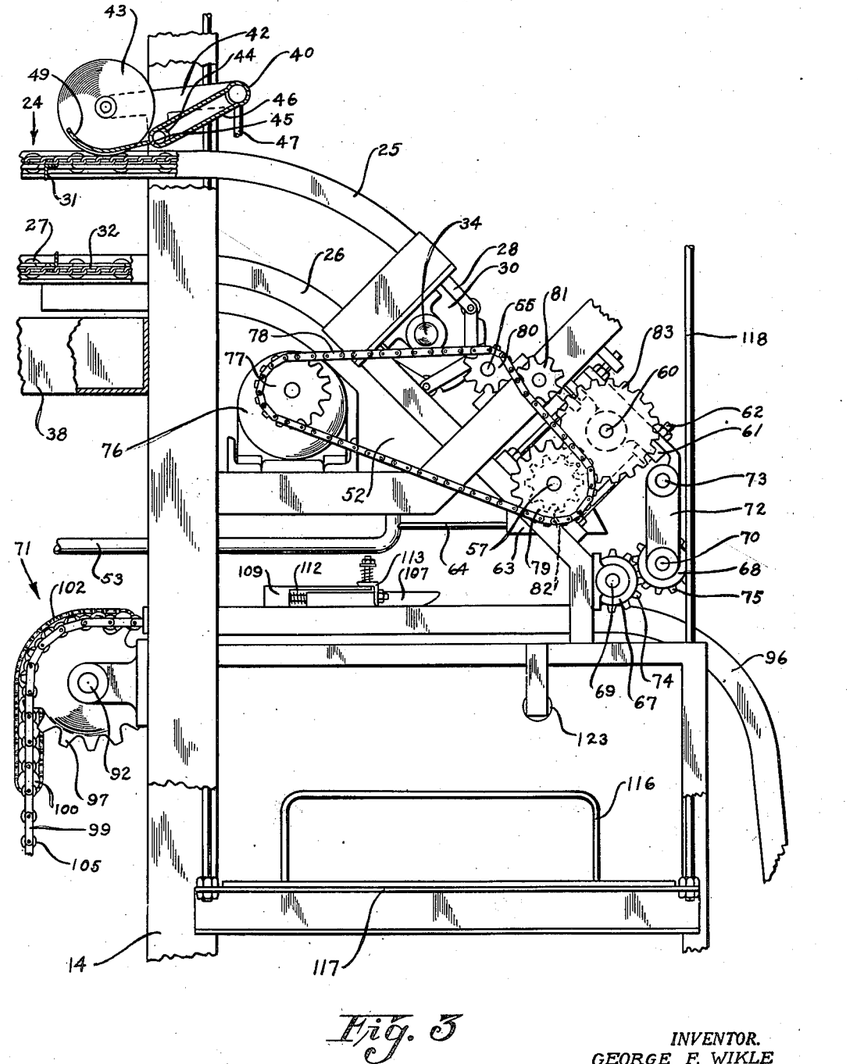
Fig. 3 is an enlarged elevational view of a portion of the apparatus, illustrating the principal drive mechanism.
Figure 4:
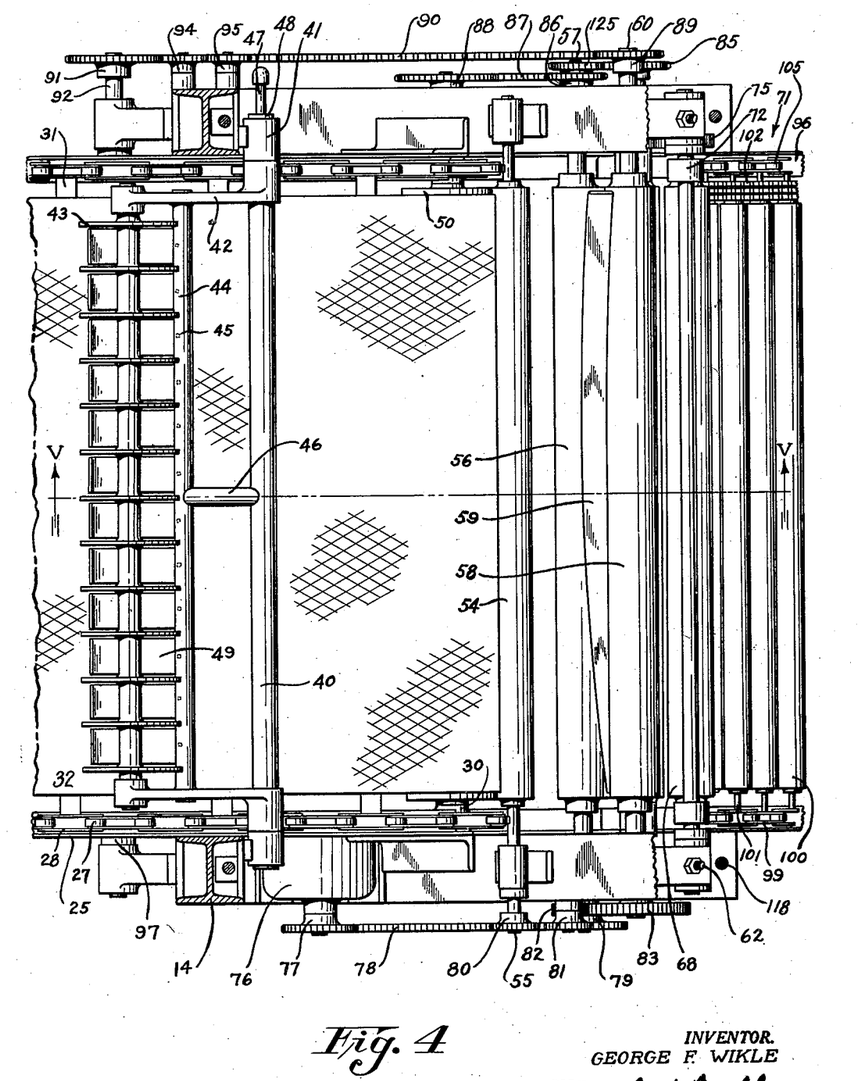
Fig. 4 is an enlarged plan view of the mechanism illustrated in Fig. 3.

Near the end of travel of the rubber stock 4 over the conveyor 24, means is provided for removing surplus water from the surface of the rubber stock. This means includes a hollow shaft 40 (Figs. 3 and 4) pivotally mounted in bearings 41 attached to the structural frame 14. Attached to the hollow shaft 40 is a pair of arms 42 which support a plurality of discs 43 for engagement with the surface of the rubber stock as it moves over the conveyor 24. A conduit 44, also supported by the arms 42, is located relatively close to the surface of the rubber stock, and is provided with a plurality of apertures 45 through which a blast of air is directed against the surface of the rubber stock. This blast of air removes the surplus water from the stock and leaves it in a relatively dry condition. A conduit 46 joins the conduit 44 with the hollow shaft 40 to form a passageway for the compressed air from a conduit 47 connected to a supply source. A swivel joint 48 between the conduit 47 and the hollow shaft 40 permits pivotal adjustment of the conduit 44 relative to the surface of the rubber stock. The discs 43 maintain a definite relationship between the surface of the rubber stock 4 and the apertures 45 from which the blast of air emerges. A plurality of deflectors 49 attached to the conduit 44 and located between the discs 43 assist in controlling the flow of air to localized areas for increasing the effectiveness of the blast of air.

At the drive end of the conveyor 24 and keyed to the shaft 34 a roller 50 (Fig. 5) is provided for supporting the wire mesh conveyor belt 32. Notches 51 are provided in the roller 50 to permit clearance for the structural angles 31 which support the belt 32. A similar roller is provided at the supporting ends of each of the conveyors 24 and 5.

An additional drain pan 52 is provided at the drive end of the conveyor 24 in order to collect any water that may drip from this portion of the conveyor. A drain line 53 removes the water from the pan 52.

Removal of the stock 4 from the conveyor 24 is assisted by a driven roller 54 (Fig. 5) keyed to a shaft 55 supported by bearings attached to the structural frame 14. From the driven roller 54 the stock passes on to a shearing device which cuts the stock into slabs 104. The shearing device includes a supporting roller 56 keyed to a shaft 57 mounted in bearings attached to the structural frame 14. The supporting roller is driven. Associated with the supporting roller 56 is a driven cutting roll 58 including a spiral blade 59 which cooperates with the supporting roller 56 to form a substantially transverse cut across the rubber stock, thus severing the stock 4 into a plurality of slabs 104. The cutting roll 58 is keyed to a shaft 60 mounted in bearings 61 supported by rods 62 connected to the structural frame 14 in a manner to permit adjustment of the cutting roll 58 in the direction of the supporting roller 56.

To facilitate the cutting operation and to prevent the rubber stock from adhering to the supporting roller 56, means is provided for moistening the surface of the rubber stock during the cutting operation. This means includes a container 63 (Fig. 5) attached to the structural frame 14 and located in such a manner as to permit a portion of the supporting roller 56 to be partly submerged in water in the container 63. A conduit 64 joins the container 63 with the drain 53 whereby water collected in the pan 52 may pass through the drain 53 and conduit 64 into the container 63. The conduit 53 includes an elevated portion 65 which functions to maintain a definite water level in the container 63. Excess water leaves the elevated portion 65 of the drain 53 and is discharged into a drain 66.

From the cutting device the stock slabs 104 pass between driven rollers 67 and 68 keyed to shafts 69 and 70, respectively, which deposit the slabs of stock on a stacking conveyor 71. The shaft 69 is mounted in bearings supported by the structural frame 14, and the shaft 70 is mounted in brackets 72 pivotally connected to the structural frame 14 at 73. The roller 67 is driven and a gear 74 keyed to the shaft 69 engages with a gear 75 keyed to the shaft 70, with the result that the roller 68 is driven in the opposite direction to that of the roller 67 to assist in removing the slabs of stock from the cutting device and for depositing the slabs on the conveyor 71. While the roller 68 is pivotally mounted to the frame 14, its weight is sufficient to form proper contact between the gears 74 and 75 and for properly engaging the rubber stock.

The cutting operation is further facilitated by driving the rollers 67 and 68 slightly faster than the movement of the stock at the cutting operation. This differential stock movement stretches the stock slightly at the margin adjacent the knife blade 59.

The cutting device and associated mechanism is driven from a combination motor and reduction unit 76 (Fig. 3) supported by the structural frame 14. A sprocket 77 attached to the motor 76 engages a chain 78 which drives a sprocket 79 keyed to the shaft 57 which is keyed to the supporting roller 56. The chain 78 also engages with a sprocket 80 keyed to the shaft 55 which drives the roller 54 located at the end of the conveyor 24. An idler sprocket 81 assist in maintaining the chain 78 in proper engagement with the sprocket 80. A gear 82 keyed to the shaft 57 engages with a gear 83 attached to the cutting roller 58, thus completing the cutting mechanism drive.

Figure 6:
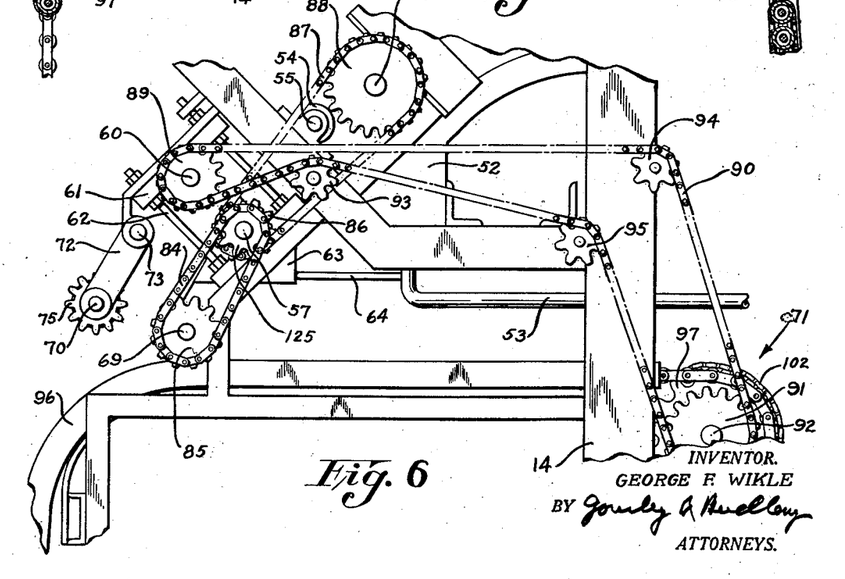
Fig. 6 is an elevational view of a portion of the apparatus, illustrating the principal drive mechanism as viewed from the side opposite that shown in Fig. 3.

The roller 67 which deposits the slabs of rubber stock onto the conveyor 71 is driven from the supporting roller shaft 57 from a sprocket 125 (Fig. 6) keyed thereto and is connected through a chain 84 to a sprocket 85 keyed to the shaft 69. Sprocket 86, also keyed to the shaft 57, drives the conveyor 24 through a chain 87 and sprocket 88 keyed to the shaft 34. A sprocket 89 keyed to the cutting roll shaft 60 meshes with a chain 90 and with a sprocket 91 keyed to a shaft 92 which drives the slab stacking conveyor 71 hereinafter described. Idler sprockets 93, 94 and 95 extending from the structural frame 14 position the chain 90 in proper relation for driving the sprocket 91.

The slab stacking mechanism comprises a conveyor 71 moving in a rectangular path, and arranged to stack the slabs within the area defined by the rectangular path. Essentially, the conveyor path is defined by a track 96 (Fig. 2) which forms three sides of the path, the remaining side of the path being occupied by the conveyor suspended between sprockets 97 and 98. Sprocket 97 is keyed to the shaft 92 mounted in bearings supported by the structural frame 14, and is driven continuously throughout the operation of the apparatus through the sprocket 91 (Fig. 6) also attached to the shaft 92 associated with drive mechanism hereinbefore described. This rectangular conveyor is of such size as to permit piling or stacking of a substantial quantity of slabs within the confines of the conveyor.

The sprocket 98, which is an idler sprocket, is mounted in bearings attached to the structural frame 14. Conveyor chains 99 engage the sprockets 97 and 98, and the track 96. The supporting part of the conveyor comprises a plurality of rollers 100 (Fig. 9) freely rotatable upon shafts 101 attached to links of the conveyor chains 99. Throughout the length of the conveyor 71 the rollers 100 are located in groups which in group relation receive and support a slab of stock thereon when the group of rollers are in a horizontal position at the upper part of the conveyor.

This grouping arrangement of the rollers 100 permits a gap between successive groups of a width sufficient to permit the slabs of rubber to move from a supported position on the rollers through the gap between the groups of rollers, and to a position within the area defining the path of the rectangular conveyor. The rollers 100 in each group are connected together by a chain 102 meshing with sprockets 103 attached to each of the rollers 100. Because of the closeness of the rollers 100, it is necessary to stagger the sprockets 103 and provide a relatively wide chain 102.

The chain 99 is provided with rollers 105 which engage the track 96, and at the curved portions of the track guide brackets 106 (Fig. 5) are provided for maintaining the chains 102 in contact with the sprockets 103.

As the rubber slabs are removed from the cutting operation each slab is laid on top of a group of the rollers 100. In the first stage of the operation the rollers 100 of a single group do not rotate about their respective axes, but merely serve as a moving table (Fig. 5) to carry the rubber stock along the path of the conveyor. When the group of rollers 100 has reached a position substantially above the stack of rubber slabs, means is provided to cause rotation of the rollers 100 rearwardly (or clockwise as viewed in Fig. 5) about their respective axes while they continue to move forwardly as a group along the conveyor path and this causes the rubber slab to remain in a relatively stationary position while the group of rollers 100 moves out from beneath the slab. As the end of the slab of rubber extends over the gap between adjacent groups of rollers, the end of the rubber stock under the influence of gravity, drops through the opening and onto the stack of slabs. The conveyor continues to move in its path, with the result that successive slabs of rubber stock are carried by and dropped from the rollers of successive groups and come to rest uniformly centered upon the stack of rubber slabs.

Figures 9, 11, 12:
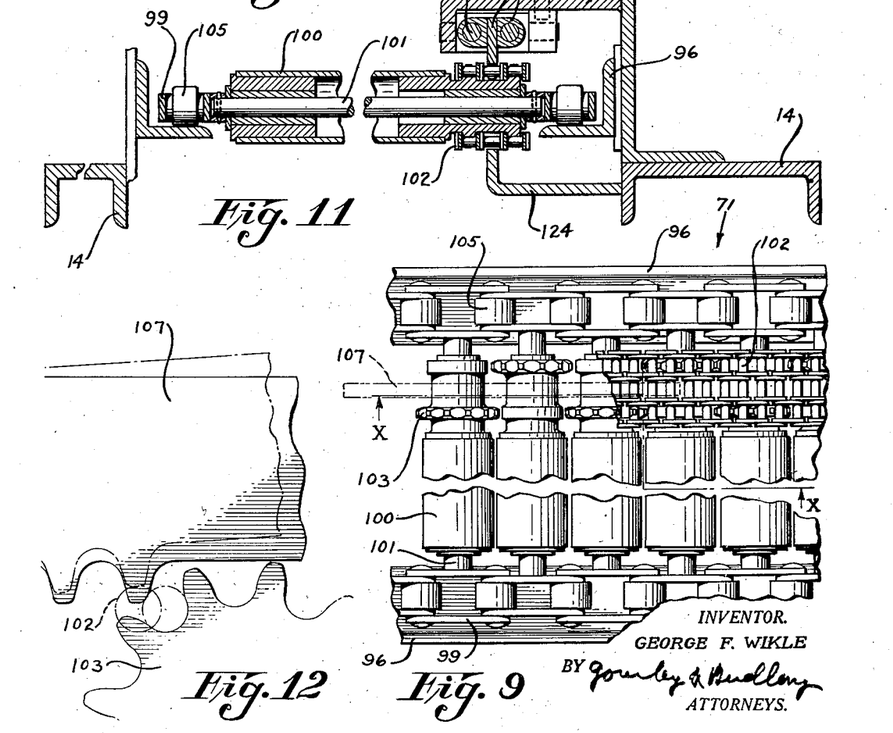
Figure 10:
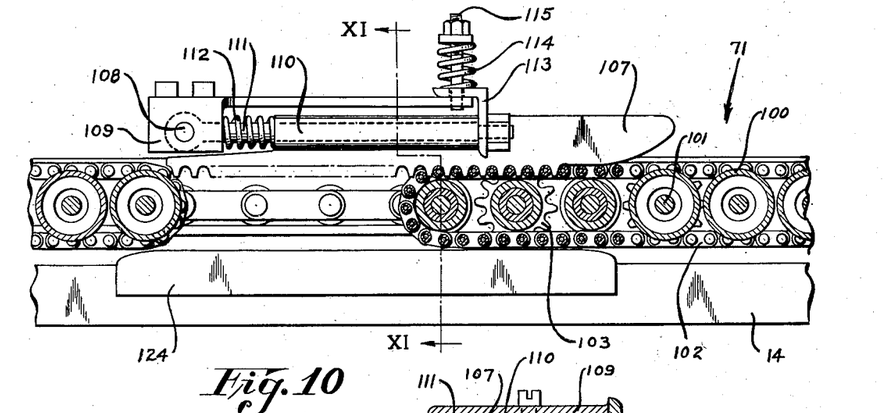
Fig. 10 is a transverse view, in section, of the slab stacking conveyor, taken along lines X—X of Fig. 9.

In order to rotate the rollers 100 rearwardly about their axes at the proper time, as indicated above, I provide a rack 107 (Fig. 10) which is engageable with the intermediate portion of the chain 102 for driving the rollers 100. A guide bar 124 is positioned below the chain 102 and opposite the rack 107 for assisting in maintaining the chain 102 in proper mesh relation with the rack 107. Except for a shock absorbing spring action, the rack 107 is substantially stationary. Its engagement with the chain 102 occurs as the chain is brought into engagement with the rack 107 due to the travel of the conveyor around its rectangular path. The rack 107 is pivotally supported at 108 from a bracket 109 attached to the structural frame 14. Sleeves 110 form a part of the rack 107 and engage rods 111 which are pivoted at 108 to the bracket 109. A spring 112 is interposed between the sleeves 110 and the bracket 109. By this arrangement a slight cushioning movement of the rack in a horizontal direction is permissible. A slight vertical cushioning movement is also provided by means of a bracket 113 secured to the rack 107 and cooperating through a spring 114 with a stud 115 attached to bracket 109. This cushioning movement of the rack 107, as shown in Fig. 12, is necessary because of the probability of improper meshing of the rack 107 with the chain 102 upon its first contact.

Figure 8:
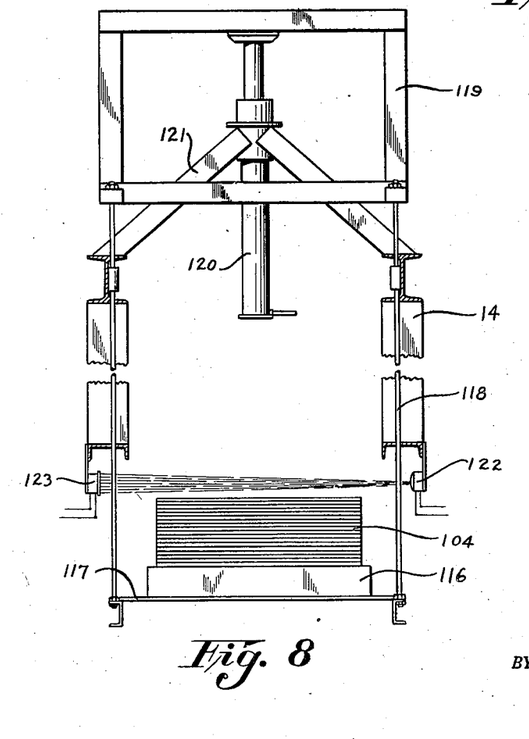
Fig. 8 is a diagrammatic elevational view, partly in section, of a device for controlling vertical movement of a stack of rubber slabs.

In order to lay the slabs of rubber in a substantially uniform stack, I provide elevating means in which the deposited slabs may be lowered progressively from a uniform depositing position in order to accommodate a substantial quantity of slabs. By this arrangement an elevator system is provided as shown in Fig. 8. For purposes of convenience, the slabs of stock are laid on a truck skid 116 or other removable support. The truck skid in turn rests upon an elevator platform 117 which, through rods 118, is supported by a frame 119. A fluid operating cylinder 120 rigidly attached to the structural frame 14 by members 121 engages with the frame 119 for raising or lowering the elevator platform 117.

Figure 5:
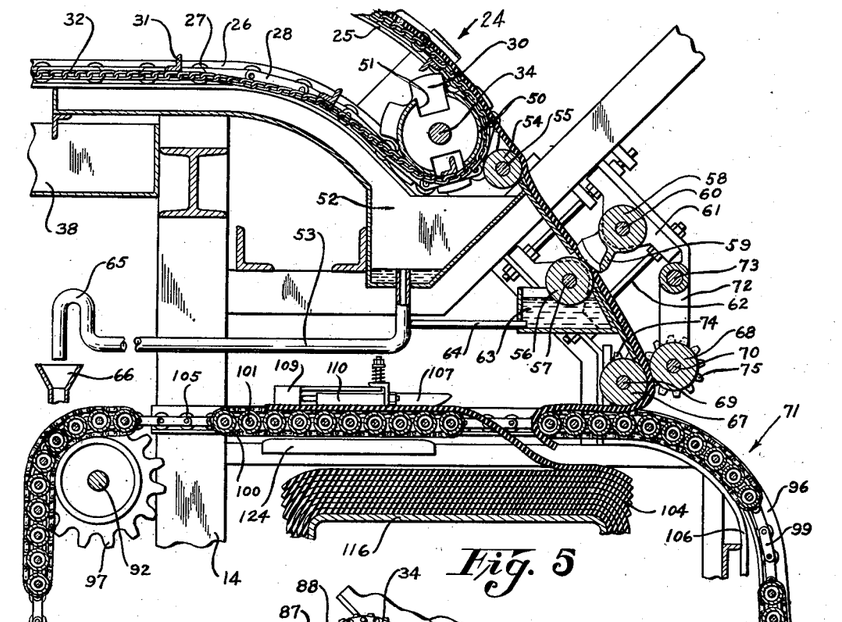
Fig. 5 is a transverse view of the mechanism, taken along lines V—V of Fig. 4.

It is preferable to maintain the top of the skid 116 or the top of the last deposited layer of stock at a substantially uniform distance relative to the conveyor 71. A preferred relation is shown in Fig. 5. In order to maintain this distance throughout the depositing operation, I provide means for lowering the elevator progressively through the medium of an electric eye, comprising units 122 and 123 (Fig. 8) which may be connected with any conventional electric valve mechanism (not shown) for operating the fluid cylinder 120 when the valve mechanism is energized by the electric eye. When the elevator platform 117 is lowered to the end of its stroke, or when a sufficient quantity of rubber slabs are deposited on the skid 116, the apparatus may be stopped by an operator and the truck skid with the stack of rubber slabs removed by any conventional means. Another truck skid 116 may be replaced on the elevator platform 117 and the platform raised to its elevated position, and the apparatus is again ready for a similar cycle of operation.

It is to be understood that stock may be fed continuously to the mill rolls 1 and 2 for continuous operation of the apparatus, or the apparatus may be operated intermittently to accommodate a quantity of rubber stock 3 deposited in the bite of the mill rolls 1 and 2.

While I have thus shown and described a preferred embodiment of my invention, it is to be understood that it may be otherwise embodied as appearing within the scope of the appended claims.

Having thus described my invention, what I claim and desire to protect by Letters Patent is:

1. An apparatus for manipulating rubber stock comprising, means for supplying a moving layer of relatively hot rubber composition in sheet form, means for coating one side of the moving layer with a lubricating material, means for cooling the layer of rubber composition while so moving, means for cutting the moving layer into slabs, and means for stacking the slabs in superimposed relation.

2. An apparatus for manipulating rubber stock comprising, means for supplying a moving layer of relatively hot rubber composition in sheet form, means for coating one side of the moving layer with a lubricating material, means for directing a cooling agent on the side of the moving layer opposite to the side coated with lubricating material, means for cutting the moving layer into slabs, and means for stacking the slabs in superimposed relation.

3. An apparatus for manipulating rubber stock comprising, means for supplying a moving layer of relatively hot rubber composition in sheet form, an open mesh conveyor belt for transporting the layer along a predetermined path, means for directing a cooling agent through the mesh conveyor belt and against the under side of the layer while so moving, means for cutting the moving layer into slabs, and means for stacking the slabs in superimposed relation.

4. An apparatus for manipulating rubber stock comprising, means for supplying a moving layer of relatively hot rubber composition in sheet form, means for coating one side of the moving layer with a lubricating material, means for cooling the moving layer of rubber composition, means for cutting the moving layer into slabs, means for stacking the slabs in superimposed relation, and means for lowering the stack of slabs progressively as additional slabs are stacked.

5. An apparatus for manipulating rubber stock comprising, means for supplying a moving layer of relatively hot rubber composition in sheet form, an open mesh conveyor belt for transporting the layer along a predetermined path, means for directing a cooling agent through the mesh conveyor belt and against the under side of the moving layer, means for cutting the moving layer into slabs, means for stacking the slabs in superimposed relation, and means for lowering the stack of slabs progressively as additional slabs are stacked.

6. An apparatus for manipulating rubber stock comprising, means for supplying a layer of relatively hot rubber composition in sheet form, an open mesh conveyor belt for transporting the layer along a predetermined path, means for coating one side of the layer with a lubricating material while being conveyed, means for directing a cooling agent through the moving mesh conveyor belt and against the under side of the layer to cool same after the lubricating material has dried upon the layer of rubber composition.

7. An apparatus for manipulating rubber stock comprising, means for supplying a layer of relatively hot rubber composition in hot sheet form, an open mesh conveyor belt for transporting the layer in one direction and a second conveyor belt positioned therebeneath for receiving the layer therefrom and transporting it in the opposite direction along a predetermined path, means for coating one side of the layer with a liquid lubricating material while being conveyed, and means between said conveyors for directing a cooling agent against portions of the opposite side of the layer positioned upon said conveyors after the lubricating material on the layer has been dried by heat therefrom.

8. The method of preparing rubber stock comprising the steps of supplying a layer of relatively hot rubber composition in sheet form, coating one side of the layer with a lubricating material, cooling the layer of rubber composition by the application of a liquid spray against the opposite side of said layer, cutting the layer into slabs, and stacking the slabs in superimposed relation.

9. The method of preparing rubber stock comprising the steps of supplying a layer of rubber composition in hot sheet form, coating one side of the layer with a liquid lubricating material and drying the lubricating material by heat from the layer, and directing a cooling agent against the other surface of the layer.

10. The method of preparing rubber stock comprising the steps of supplying a layer of relatively hot rubber composition in sheet form, coating one side of the layer with a lubricating material, cooling the layer of rubber composition by the application of a liquid spray against the opposite side of said layer, cutting the layer into slabs, stacking the slabs in superimposed relation, and lowering the stack of slabs progressively as additional slabs are stacked.

11. The method of preparing rubber stock comprising the steps of supplying a layer of relatively hot rubber composition in sheet form, coating one side of the layer with a lubricating material, directing a cooling agent on the surface of the rubber stock opposite to the surface coated with lubricating material, cutting the layer into slabs, and stacking the slabs in superimposed relation.

12. The method of preparing rubber stock comprising the steps of supplying a layer of rubber composition in hot sheet form, coating one side of the layer with a lubricating material, drying said lubricating material by heat from said layer, moving the layer in a manner to permit its under side to be at least partially exposed, cooling the rubber layer by directing a cooling agent against its under side, cutting the layer into slabs, and stacking the slabs in superimposed relation.

13. The method of preparing rubber stock comprising the steps of supplying a layer of relatively hot rubber composition in sheet form, moving the layer in a manner to permit its under side to be at least partially exposed, cooling the rubber layer by directing a cooling agent against its under side, reversing and moving the layer beneath its exposed portion whereby the same side of the layer is subjected to the cooling agent directed against the layer while travelling in opposite directions.

14. The method of preparing rubber stock comprising the steps of continuously advancing a body of stock in a heated condition, applying a liquid lubricating material to one surface of the stock, utilizing the heat of the stock for drying the lubricating material, and applying a cooling agent to the other surface of the stock.

15. The method of preparing rubber stock comprising the steps of continuously advancing a body of stock in a heated condition, applying a liquid lubricating material to one surface of the stock, utilizing the heat of the stock for drying the lubricating material, looping the stock to bring portions of the other surface of the layer into proximity, and applying a cooling agent to the stock surface at the inside of the loop.

GEORGE F. WIKLE.